United States Patent
Almutairi et al.

(10) Patent No.: US 10,202,261 B2
(45) Date of Patent: Feb. 12, 2019

(54) HEURISTIC FUZZY CONTROLLER FOR GANTRY CRANES

(71) Applicant: KUWAIT UNIVERSITY, Safat (KW)

(72) Inventors: Naif B. Almutairi, Safat (KW); Mohamed Zribi, Safat (KW)

(73) Assignee: Kuwait University, Safat (KW)

( * ) Notice: Subject to any disclaimer, the term of this patent is extended or adjusted under 35 U.S.C. 154(b) by 126 days.

(21) Appl. No.: 15/490,513

(22) Filed: Apr. 18, 2017

(65) Prior Publication Data
US 2018/0297821 A1    Oct. 18, 2018

(51) Int. Cl.
| | | |
|---|---|---|
| G06F 7/70 | (2006.01) |
| G06F 19/00 | (2018.01) |
| G06G 7/00 | (2006.01) |
| G06G 7/76 | (2006.01) |
| B66C 13/18 | (2006.01) |
| G05B 13/02 | (2006.01) |
| B66C 19/00 | (2006.01) |

(52) U.S. Cl.
CPC .......... *B66C 13/18* (2013.01); *G05B 13/0275* (2013.01); *B66C 19/00* (2013.01)

(58) Field of Classification Search
CPC ...... B66C 13/18; B66C 19/00; G05B 13/0275
See application file for complete search history.

(56) References Cited

U.S. PATENT DOCUMENTS

| | | | | |
|---|---|---|---|---|
| 4,997,095 A | * | 3/1991 | Jones | B25J 9/026 |
| | | | | 212/275 |
| 5,436,832 A | | 7/1995 | Bessacini et al. | |
| 5,785,191 A | * | 7/1998 | Feddema | B66C 13/063 |
| | | | | 212/275 |
| 5,796,919 A | | 8/1998 | Kubica | |
| 5,988,411 A | * | 11/1999 | Singer | B66C 13/063 |
| | | | | 212/275 |
| 6,772,134 B1 | | 8/2004 | Jacubasch et al. | |
| 7,367,464 B1 | * | 5/2008 | Agostini | B66C 13/063 |
| | | | | 212/308 |
| 8,311,970 B2 | * | 11/2012 | Mcaree | E02F 9/226 |
| | | | | 702/174 |
| 8,443,936 B1 | * | 5/2013 | Raymond | B66F 11/046 |
| | | | | 182/2.1 |
| 8,857,567 B1 | * | 10/2014 | Raymond | B66F 11/046 |
| | | | | 182/2.1 |
| 9,096,294 B1 | * | 8/2015 | Dong | B63B 27/32 |

FOREIGN PATENT DOCUMENTS

GB    2 280 045 A    1/1995

OTHER PUBLICATIONS

Cheng-Yuan Chang and Fuh-Hsin Hwang, "Fuzzy control of non-linear crane system," 2006 IEEE/SMC International Conference on System of Systems Engineering, Apr. 24-26, 2006.

* cited by examiner

*Primary Examiner* — Mussa A Shaawat
(74) *Attorney, Agent, or Firm* — Richard C. Litman (57) ABSTRACT

The heuristic fuzzy controller for gantry cranes provides for controlling the position of the cart of a gantry crane while suppressing the swing angle of the payload. The rules of the controller are obtained taking into account the knowledge of an experienced crane operator. The controller uses only one fuzzy system to achieve the two control objectives.

9 Claims, 10 Drawing Sheets

HEURISTIC FUZZY CONTROLLER FOR GANTRY CRANES

BACKGROUND OF THE INVENTION

1. Field of the Invention

The present invention relates to nonlinear controllers, and particularly to a heuristic fuzzy controller to control the position of a cart of a gantry crane.

2. Description of the Related Art

Gantry cranes are used in many industrial applications. Generally, they are used in maintenance and in manufacturing applications because in these applications, efficiency and downtime are very important economic factors.

In controlling a gantry crane, one has to ensure that the cart is properly positioned while minimizing the swings of the payload. Hence, the cart of the crane should move toward its destination as fast and as precise as possible, while the swings of the payload should be kept as small as possible. However, the motion of the cart of the crane is always accompanied with swings of the payload. These swings can be dangerous and may cause damage or accidents. Moreover, the parameters of the crane and the payload are generally not known exactly. Also, external disturbances might act on the crane system. Therefore, it is necessary to develop controllers to properly control gantry cranes, even when some of their parameters are not known exactly and/or when some disturbances are acting on the crane.

Thus, a heuristic fuzzy controller for gantry cranes solving the aforementioned problems is desired.

SUMMARY OF THE INVENTION

The heuristic fuzzy controller for gantry cranes provides a means to control the position of the cart of a gantry crane while suppressing the swing angle of the payload. The rules of this controller are obtained taking into account the knowledge of an experienced crane operator. The controller uses only one fuzzy system to achieve two control objectives.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 10:
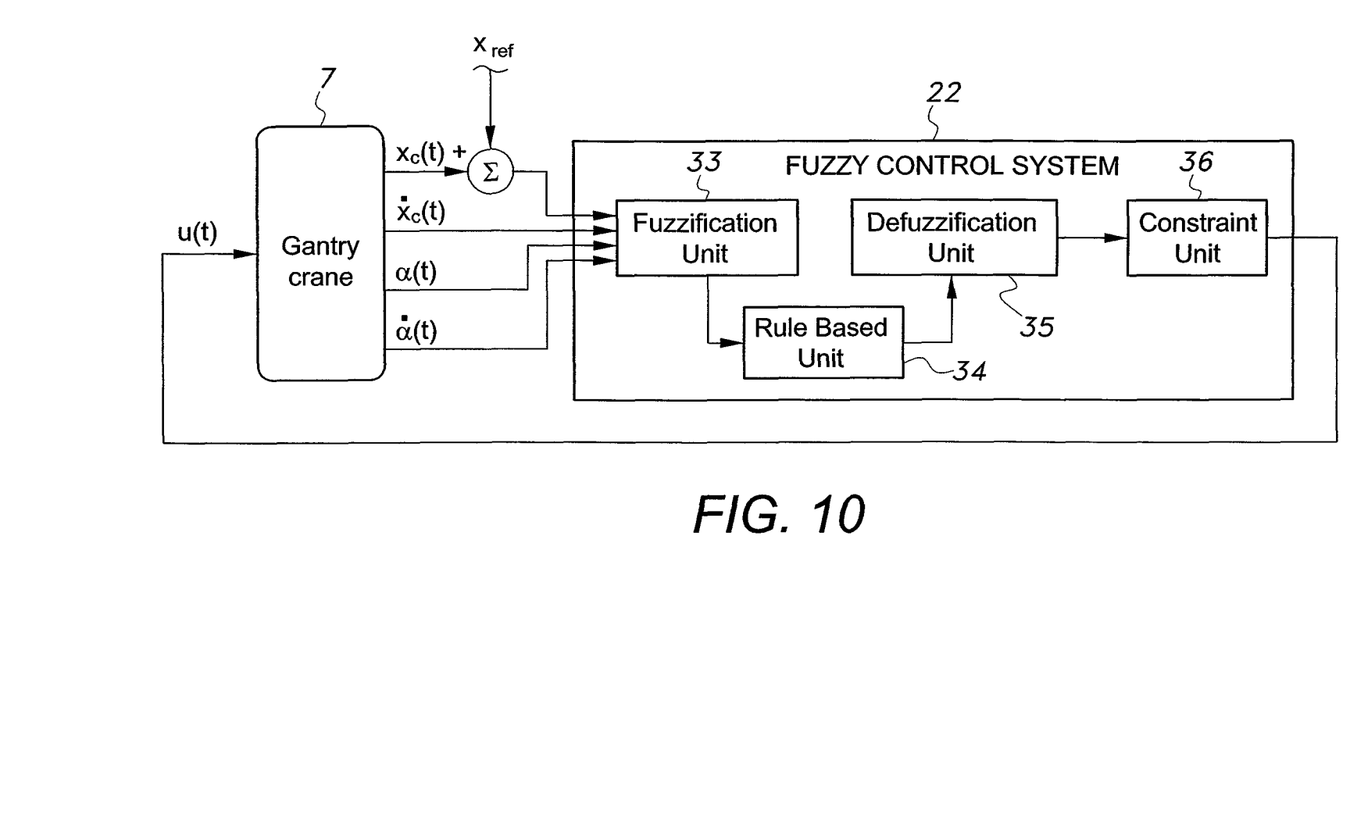
FIG. 10 is a block diagram of a heuristic fuzzy controller for gantry cranes according to the present invention.

At the outset, it should be understood by one of ordinary skill in the art that embodiments of the present heuristic fuzzy controller 22 (shown in FIG. 10) can comprise software or firmware code executing on a computer, a microcontroller, a microprocessor, or a DSP processor; state machines implemented in application specific or programmable logic; or numerous other forms without departing from the spirit and scope of the heuristic fuzzy controller described herein. The present heuristic fuzzy controller 22 can be provided as a computer program, which includes a non-transitory machine-readable medium having stored thereon instructions that can be used to program a computer (or other electronic devices) to perform a process implementing the present heuristic fuzzy controller 22. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

The present heuristic fuzzy controller 22 for gantry cranes, such as gantry crane 7, provides a means to control the position of the cart of the gantry crane 7 while suppressing the swing angle of the payload. The rules of the present controller 22 are obtained taking into account the knowledge of an experienced crane operator. The controller uses only one fuzzy system to achieve the control objectives.

The present controller 22 is called a heuristic fuzzy controller because it is based on developing heuristic fuzzy rules (in terms of fuzzy IF-THEN rules) obtained from an expert in controlling gantry cranes. The heuristic approach is a conventional method to design a fuzzy controller for a given system. This approach needs a good understanding of the physics of the system and the knowledge of an experienced operator in order to construct the fuzzy rules that describe an expert operator action. The heuristic approach includes the following four steps: (1) analyze the real system and choose the states and control variables; (2) derive fuzzy IF-THEN rules that relate the state variables to the control variables; (3) combine these derived fuzzy IF-THEN rules into a fuzzy system; and (4) test the performance of the closed-loop system when using the developed fuzzy system as the controller.

In order to develop a fuzzy controller based on heuristic rules for a gantry crane system, the following linguistic variables and their associated fuzzy sets are used to describe the fuzzy controller.

Figure 1:
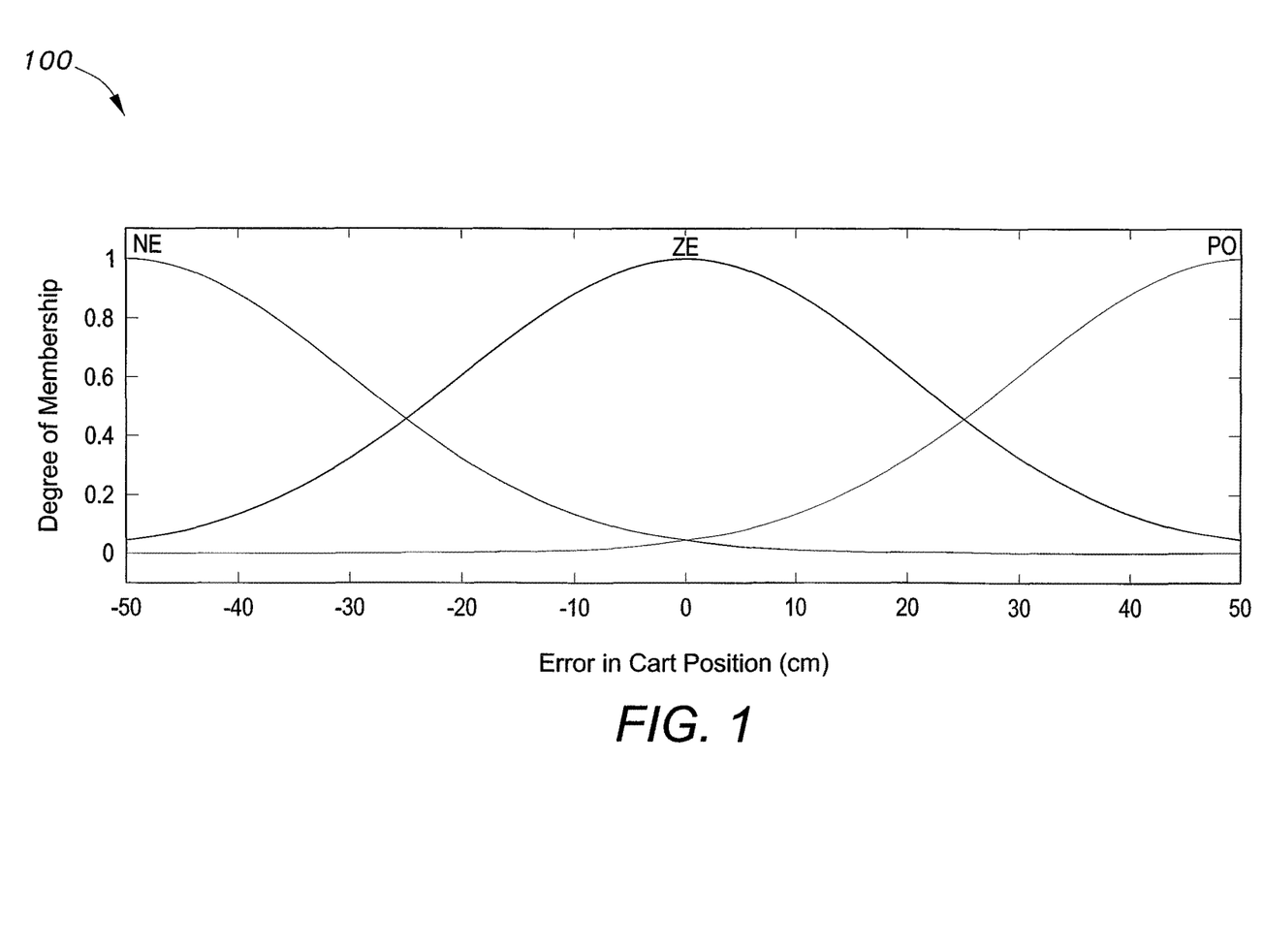
FIG. 1 is a plot showing the membership functions for an error in cart position variable input to a heuristic fuzzy controller for gantry cranes according to the present invention.
Figure 2:
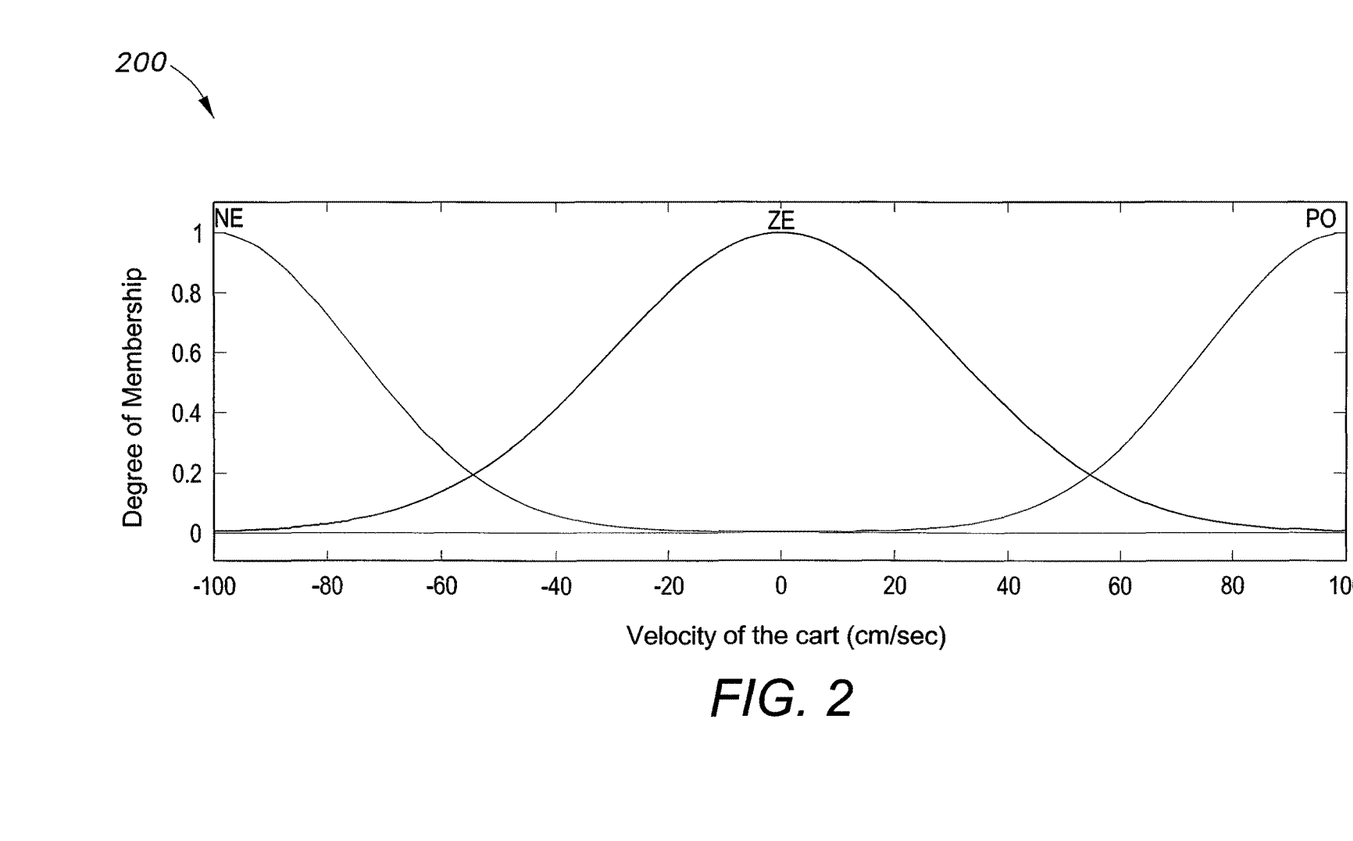
FIG. 2 is a plot showing the membership functions for a cart velocity variable input to a heuristic fuzzy controller for gantry cranes according to the present invention.
Figure 3:
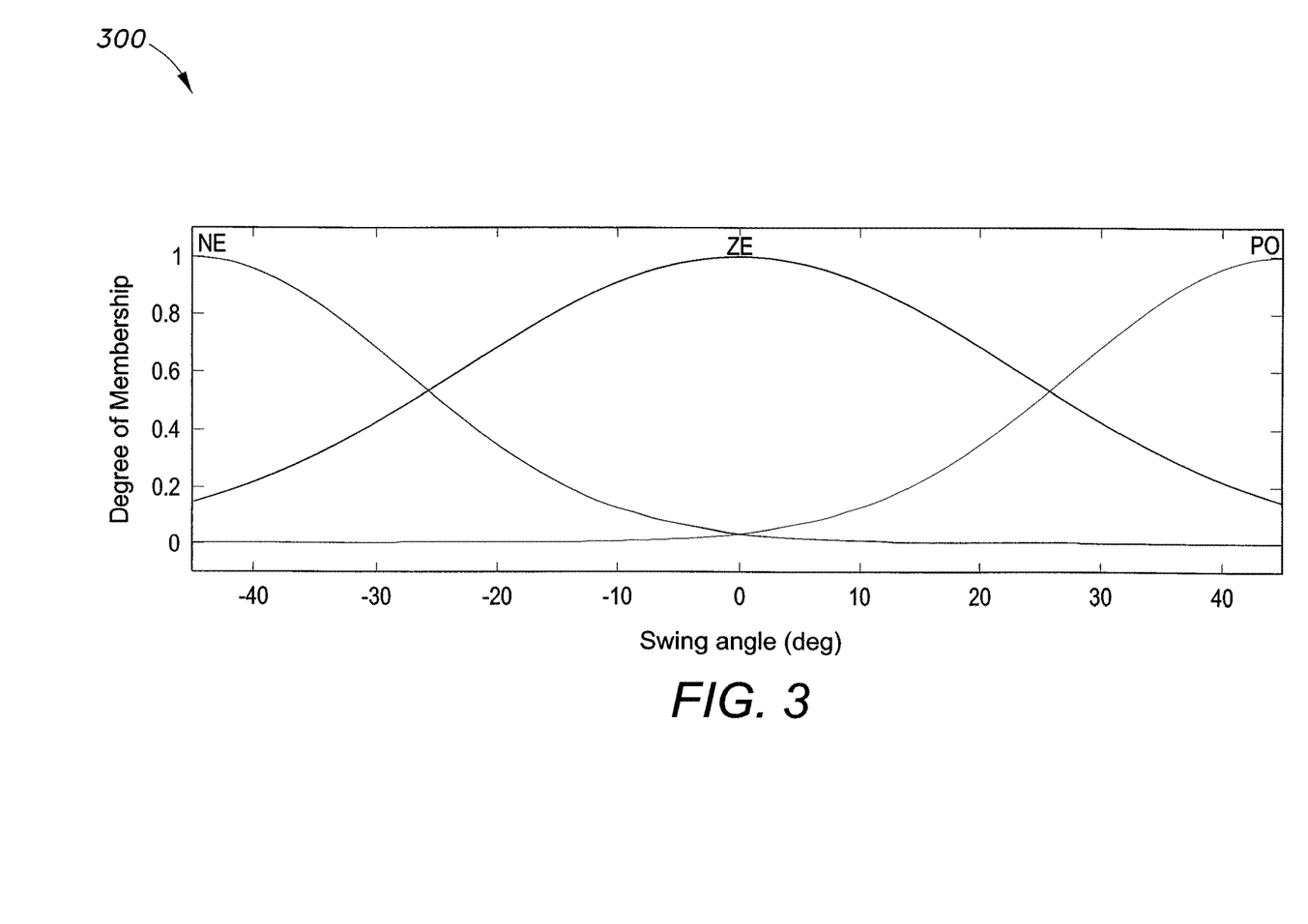
FIG. 3 is a plot showing the membership functions for a swing angle variable input to a heuristic fuzzy controller for gantry cranes according to the present invention.

The first linguistic input variable for the present fuzzy controller 22 is the error in the cart position, namely, $e(t)=x_c(t)-x_{ref}$. Three fuzzy sets are used to describe this variable and are designed to cover the range of the variable $e(t)$ in the interval $[e_{min}, e_{max}]$. The fuzzy sets used are Negative (NE), Zero (ZE) and Positive (PO). The membership functions used to describe this linguistic variable with $e_{min}=-50$ cm and $e_{max}=50$ cm are shown in FIG. 1. The second linguistic input variable is the velocity of the cart, namely, $\dot{x}_c(t)$. This variable is limited within a range of $[\dot{x}_{min}, \dot{x}_{max}]$. Again, three fuzzy sets are used to describe this variable, viz., Negative (NE), Zero (ZE) and Positive (PO). The membership functions are shown in FIG. 2 with $\dot{x}_{min}=-100$ cm/sec and $\dot{x}_{max}=100$ cm/sec. The third linguistic input variable is the swing angle of the pendulum, $\alpha(t)$. This variable is limited within a range of $[\alpha_{min}, \alpha_{max}]$. Again, we used three fuzzy sets, namely, Negative (NE), Zero (ZE) and Positive (PO), to cover its range. The membership functions used to describe this linguistic variable are shown in FIG. 3 with $\alpha_{min}=-45°$ and $\alpha_{max}=+45°$.

Figure 4:
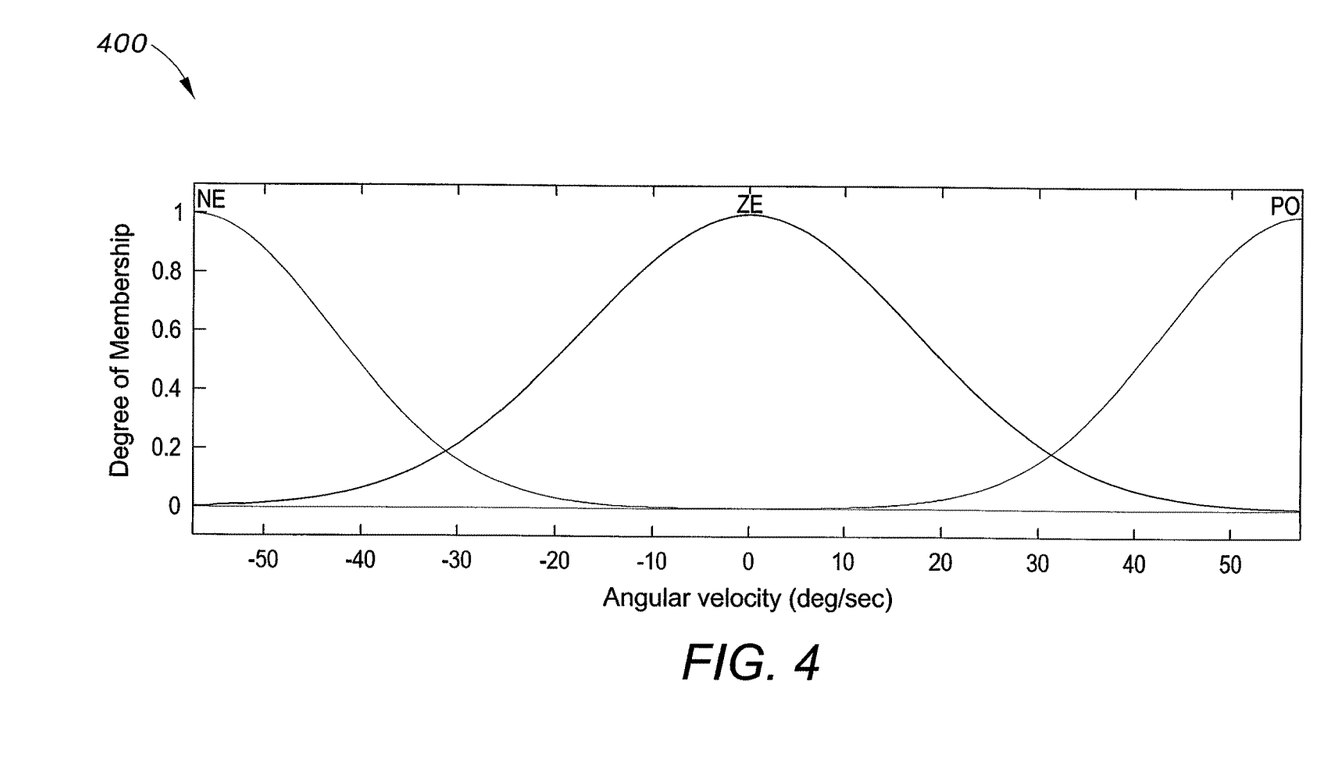
FIG. 4 is a plot showing the membership functions for an angular velocity variable input to a heuristic fuzzy controller for gantry cranes according to the present invention.
Figure 5:
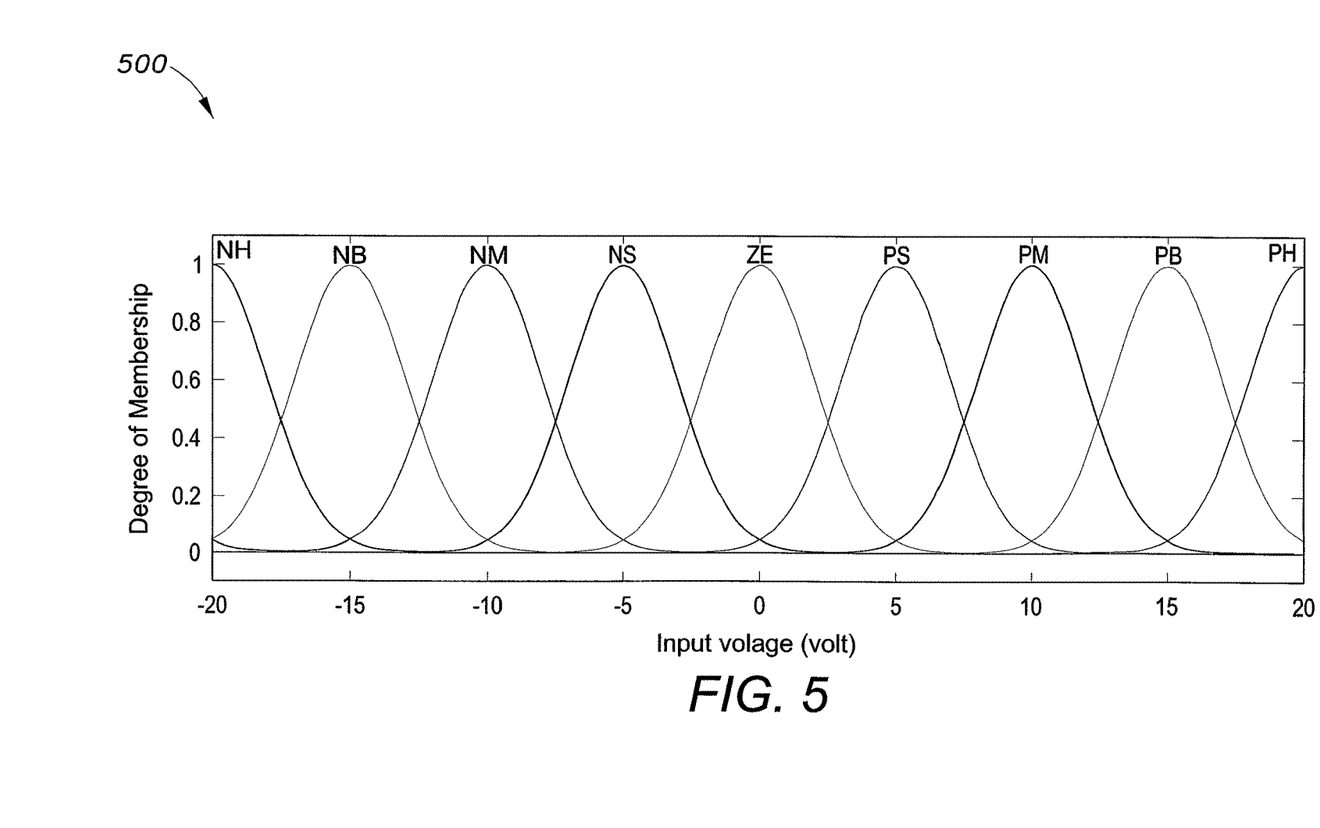
FIG. 5 is a plot showing the membership functions for an output variable for voltage input to the servo motor for a heuristic fuzzy controller for gantry cranes according to the present invention.

The fourth linguistic input variable is the angular velocity of the payload, $\dot{\alpha}(t)$. This variable is within a range of $[\dot{\alpha}_{min}, \dot{\alpha}_{max}]$. Again, we used three fuzzy sets, namely, Negative (NE), Zero (ZE) and Positive (PO), to cover its range. The membership functions used to describe this linguistic variable are shown in FIG. 4 with $\dot{\alpha}_{min}=-55°$ and $\dot{\alpha}_{max}=+55°$. The linguistic output variable for the fuzzy controller 22 is the voltage $u(t)$ applied to the servo motor. It has a range of $[u_{min}, u_{max}]$. We use nine fuzzy sets to cover this range. The fuzzy sets used to cover the negative portion of this range are denoted by Negative High (NH), Negative Big (NB), Negative Medium (NM), and Negative Small (NS). The Zero fuzzy set is (ZE). The four fuzzy sets used to cover the positive portion of the range are Positive Small (PS), Positive Medium (PM), Positive Big (PB), and Positive High (PH). The membership functions used to describe the linguistic output variable are shown in FIG. 5 with $u_{min}=-20$ volts and $u_{max}=+20$ volts. All membership functions used in this control scheme are assumed to be Gaussian functions. From the above input and output linguistic variables and the associated fuzzy sets used to describe these variables, a total of 81 fuzzy rules were derived, based on heuristics and a deep understanding of the dynamics and the control of the gantry crane system. The objective of these fuzzy heuristic rules is to control the position of the cart while suppressing the swing angle of the payload. The generated 81 fuzzy rules are listed in Table 1.

TABLE 1

Heuristic Fuzzy Rules Used In the Gantry Controller

| Fuzzy Rule No. | e(t) | $\dot{x}_c$(t) | α(t) | $\dot{α}$(t) | u(t) |
|---|---|---|---|---|---|
| 1 | NE | NE | NE | NE | ZE |
| 2 | NE | ZE | NE | NE | NS |
| 3 | NE | PO | NE | NE | NM |
| 4 | NE | NE | NE | ZE | ZE |
| 5 | NE | ZE | NE | ZE | NS |
| 6 | NE | PO | NE | ZE | NM |
| 7 | NE | NE | NE | PO | ZE |
| 8 | NE | ZE | NE | PO | NS |
| 9 | NE | PO | NE | PO | NM |
| 10 | ZE | NE | NE | NE | NM |
| 11 | ZE | ZE | NE | NE | NB |
| 12 | ZE | PO | NE | NE | NH |
| 13 | ZE | NE | NE | ZE | NS |
| 14 | ZE | ZE | NE | ZE | NM |
| 15 | ZE | PO | NE | ZE | NB |
| 16 | ZE | NE | NE | PO | ZE |
| 17 | ZE | ZE | NE | PO | NS |
| 18 | ZE | PO | NE | PO | NM |
| 19 | PO | NE | NE | NE | NM |
| 20 | PO | ZE | NE | NE | NB |
| 21 | PO | PO | NE | NE | NH |
| 22 | PO | NE | NE | ZE | NM |
| 23 | PO | ZE | NE | ZE | NB |
| 24 | PO | PO | NE | ZE | NH |
| 25 | PO | NE | NE | PO | NM |
| 26 | PO | ZE | NE | PO | NB |
| 27 | PO | PO | NE | PO | NH |
| 28 | NE | NE | ZE | NE | PS |
| 29 | NE | ZE | ZE | NE | ZE |
| 30 | NE | PO | ZE | NE | NS |
| 31 | NE | NE | ZE | ZE | PM |
| 32 | NE | ZE | ZE | ZE | PS |
| 33 | NE | PO | ZE | ZE | ZE |
| 34 | NE | NE | ZE | PO | PB |
| 35 | NE | ZE | ZE | PO | PM |
| 36 | NE | PO | ZE | PO | PS |
| 37 | ZE | NE | ZE | NE | ZE |
| 38 | ZE | ZE | ZE | NE | NS |
| 39 | ZE | PO | ZE | NE | NM |
| 40 | ZE | NE | ZE | ZE | PS |
| 41 | ZE | ZE | ZE | ZE | ZE |
| 42 | ZE | PO | ZE | ZE | NS |
| 43 | ZE | NE | ZE | PO | PM |
| 44 | ZE | ZE | ZE | PO | PS |
| 45 | ZE | PO | ZE | PO | ZE |
| 46 | PO | NE | ZE | NE | NS |
| 47 | PO | ZE | ZE | NE | NM |
| 48 | PO | PO | ZE | NE | NB |
| 49 | PO | NE | ZE | ZE | ZE |
| 50 | PO | ZE | ZE | ZE | NS |
| 51 | PO | PO | ZE | ZE | NM |
| 52 | PO | NE | ZE | PO | PS |
| 53 | PO | ZE | ZE | PO | ZE |
| 54 | PO | PO | ZE | PO | NS |
| 55 | NE | NE | PO | NE | PH |
| 56 | NE | ZE | PO | NE | PB |
| 57 | NE | PO | PO | NE | PM |
| 58 | NE | NE | PO | ZE | PH |
| 59 | NE | ZE | PO | ZE | PB |
| 60 | NE | PO | PO | ZE | PM |
| 61 | NE | NE | PO | PO | PH |
| 62 | NE | ZE | PO | PO | PB |
| 63 | NE | PO | PO | PO | PM |
| 64 | ZE | NE | PO | NE | PM |
| 65 | ZE | ZE | PO | NE | PS |
| 66 | ZE | PO | PO | NE | ZE |
| 67 | ZE | NE | PO | ZE | PB |
| 68 | ZE | ZE | PO | ZE | PM |
| 69 | ZE | PO | PO | ZE | PS |
| 70 | ZE | NE | PO | PO | PH |
| 71 | ZE | ZE | PO | PO | PB |
| 72 | ZE | PO | PO | PO | PM |
| 73 | PO | NE | PO | NE | PM |
| 74 | PO | ZE | PO | NE | PS |
| 75 | PO | PO | PO | NE | ZE |
| 76 | PO | NE | PO | ZE | PM |
| 77 | PO | ZE | PO | ZE | PS |
| 78 | PO | PO | PO | ZE | ZE |
| 79 | PO | NE | PO | PO | PM |
| 80 | PO | ZE | PO | PO | PS |
| 81 | PO | PO | PO | PO | ZE |

To combine these rules, we have used a product inference engine in rule-based unit 34 (shown in FIG. 10), a singleton fuzzifier in fuzzification unit 33, and a center average defuzzifier in defuzzification unit 35. The constraint unit 36 may be used to keep a crisp, defuzzified output of defuzzification unit 35 within bounds, e.g., voltage output u(t) should be constrained to normal operating range within $u_{min}=-20$ volts and $u_{max}=+20$ volts.

The experimental setup for testing the heuristic fuzzy controller consists of a pendulum mounted on a cart, which is free to move along the cart's axis of motion. The cart is made of solid aluminum, and it is driven by a rack and pinion mechanism using a DC motor energized by crisp output voltage derived from defuzzifier output u(t). The cart slides along a stainless steel shaft using linear bearings. The cart position is measured using a potentiometer coupled to the rack via a pinion, while the swing angle of the pendulum is measured using another potentiometer coupled to the pendulum via an additional pinion. In addition, the velocity of the cart and the angular velocity of the payload are computed by differentiating the cart displacement and the swing angle of the payload, respectively.

Figure 6:
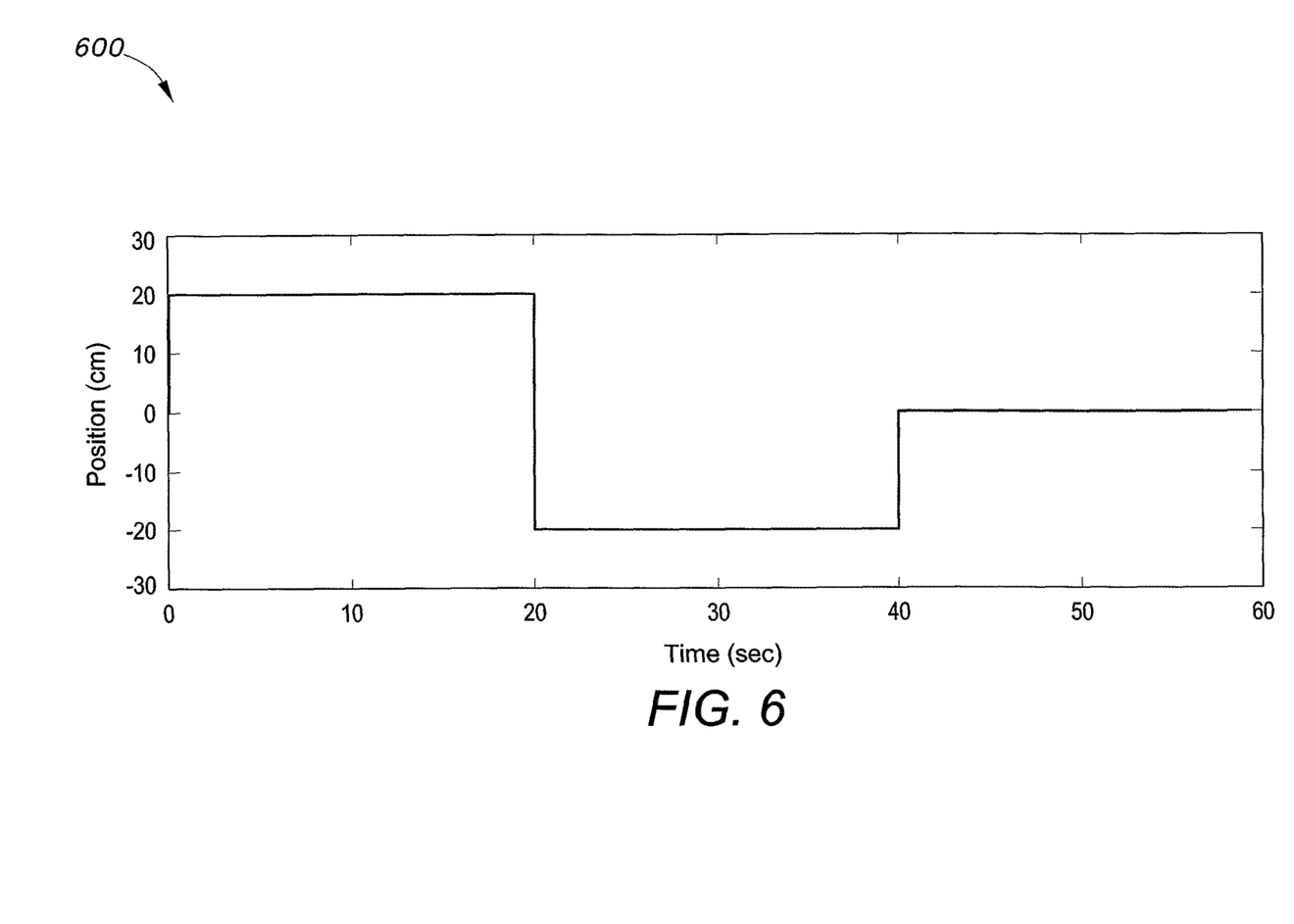
FIG. 6 is a plot showing cart desired position vs. time profile used in a simulation testing the heuristic fuzzy controller for gantry cranes according to the present invention.

The simulation results when using the proposed heuristic fuzzy controller are now presented. The simulations are performed using the zero initial conditions and the desired cart position profile depicted in plot 600 of FIG. 6. The actual and desired cart positions when using the heuristic fuzzy controller are shown in plot 700 of FIG. 7, while the swing angle of the payload is shown in plot 800 of FIG. 8. The input voltage applied to the servo motor of the cart is shown in plot 900 of FIG. 9.

Figure 7:
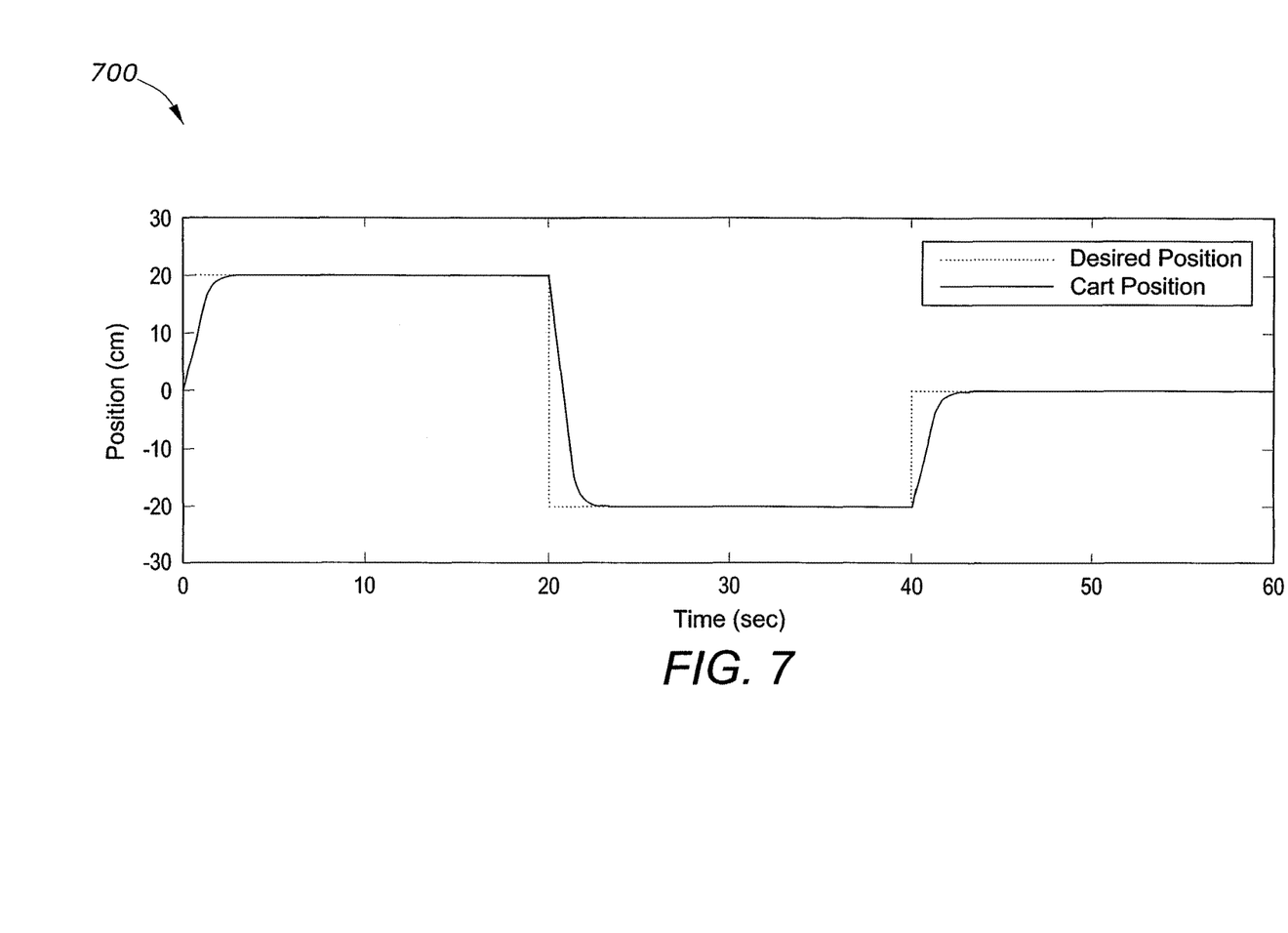
FIG. 7 is a plot showing desired vs. actual position profile over time in a simulation testing the heuristic fuzzy controller for gantry cranes according to the present invention.
Figure 8:
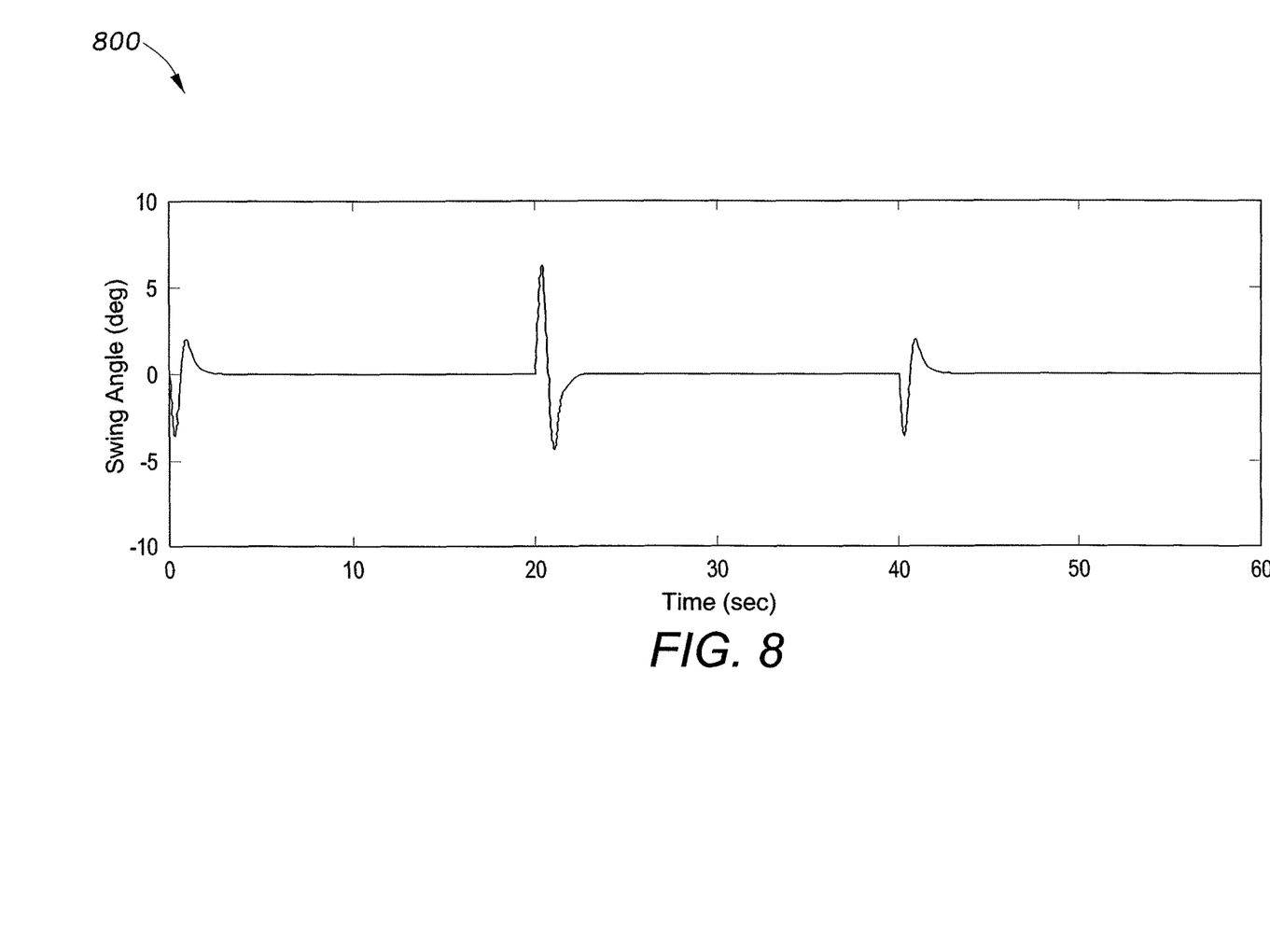
FIG. 8 is a plot showing swing angle vs. time in a simulation testing the heuristic fuzzy controller for gantry cranes according to the present invention.
Figure 9:
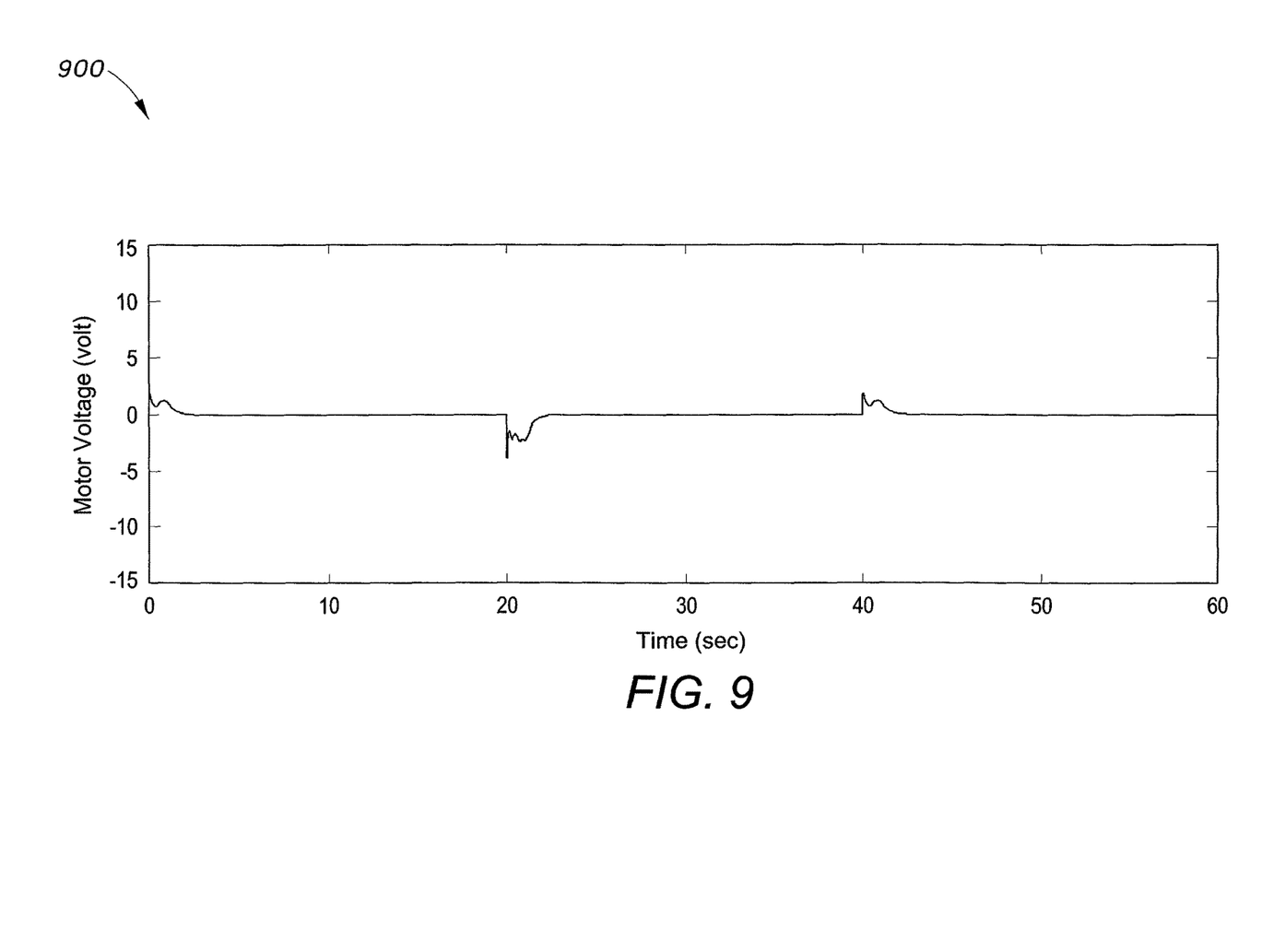
FIG. 9 is a plot illustrating motor voltage input to the servo motor vs. time in a simulation testing the heuristic fuzzy controller for gantry cranes according to the present invention.

It can be seen from FIGS. 7 through 9 that the cart position reached its desired values in a reasonable time with small swing angles. The settling times, as well as the maximum percentage overshoots of the cart position trajectories for each of the different reference positions, are computed. In addition, the maximum swing angles associated with each reference position are computed. These results are summarized in Table 2.

TABLE 2

Summary of the Simulation Results When Using the Heuristic Fuzzy Controller

| Desired position, $x_{ref}$, in cm | $x_{ref}=+20$ | $x_{ref}=-20$ | $x_{ref}=0.0$ |
|---|---|---|---|
| Settling time for $x_c(t)$ in sec | 2.34 | 2.11 | 2.33 |
| Maximum % overshoot for $x_c(t)$ | 0% | 0% | 0% |
| Maximum swing angle in (deg) | 3.56 | 6.23 | 3.56 |

The summary of the results in Table 2 indicate that the settling times for each of the three cases is less than 2.5 (sec) and the maximum swing angle is less than 6.5°. The responses of the three cases did not display any overshoot. Moreover, it is noted that the control input signal is within an acceptable range. Therefore, it can be concluded that the proposed heuristic fuzzy controller when applied to the gantry crane system works well.

It is to be understood that the present invention is not limited to the embodiments described above, but encompasses any and all embodiments within the scope of the following claims.

We claim:

1. A heuristic fuzzy controller for gantry cranes operable on a processor connected to a storage memory, the controller comprising:
   memory linguistic input variables e(t), $\dot{x}_c(t)$, α(t), and $\dot{α}(t)$ and means for storing the memory linguistic input variables in the memory, where e(t) is error in a cart position of the gantry crane, $\dot{x}_c(t)$ is a velocity of the cart, α(t) is a swing angle of a payload of the cart, and $\dot{α}(t)$ is an angular velocity of the payload;
   fuzzy sets for each of the linguistic input variables and means for storing the fuzzy sets in the memory, each of the fuzzy sets describing its respective linguistic input variable;
   a membership function for each of the fuzzy sets and means for storing the membership function in the memory;
   means for fuzzifying the e(t), $\dot{x}_c(t)$, α(t), and $\dot{α}(t)$ linguistic inputs based on the membership functions of the fuzzy sets;
   a linguistic output voltage variable u(t) and means for storing the linguistic output voltage variable in the memory;
   a fuzzy set for the linguistic output voltage variable u(t) and means for storing the fuzzy set in the memory, the fuzzy set describing the linguistic output voltage variable u(t);
   a set of heuristic fuzzy rules operable in the processor and means for storing the set of heuristic fuzzy rules in the memory, the heuristic fuzzy rules being determined from action of an expert gantry crane operator, the fuzzy rules having objectives of moving the cart to a desired position and minimizing angular swing of the cart's payload while moving the cart;
   a rule-based unit means for combining the heuristic fuzzy rules to determine which of the heuristic fuzzy rules to execute based on an output of the fuzzifying means at a particular instant;
   a defuzzifier means for outputting a crisp version of output voltage variable u(t) responsive to an output of the rule-based unit; and
   means for applying the crisp output voltage to a DC steering and translation servo motor of the cart.

2. The heuristic fuzzy controller for gantry cranes according to claim 1, wherein the cart position error e(t) fuzzy sets consist of a Negative (NE) fuzzy set, a Zero (ZE) fuzzy set, and a Positive (PO) fuzzy set.

3. The heuristic fuzzy controller for gantry cranes according to claim 1, wherein the cart velocity $\dot{x}_c(t)$ fuzzy sets consist of a Negative (NE) fuzzy set, a Zero (ZE) fuzzy set, and a Positive (PO) fuzzy set.

4. The heuristic fuzzy controller for gantry cranes according to claim 1, wherein the payload swing angle α(t) fuzzy sets consist of a Negative (NE) fuzzy set, a Zero (ZE) fuzzy set, and a Positive (PO) fuzzy set.

5. The heuristic fuzzy controller for gantry cranes according to claim 1, wherein the payload swing angle velocity $\dot{α}(t)$ fuzzy sets consist of a Negative (NE) fuzzy set, a Zero (ZE) fuzzy set, and a Positive (PO) fuzzy set.

6. The heuristic fuzzy controller for gantry cranes according to claim 1, wherein the output voltage u(t) fuzzy sets consist of:
   a Negative High (NH) fuzzy set, a Negative Big (NB) fuzzy set, a Negative Medium (NM) fuzzy set, and a Negative Small (NS) fuzzy set;
   a Zero (ZE) fuzzy set; and a Positive Small (PS) fuzzy set, a Positive Medium (PM) fuzzy set, a Positive Big (PB) fuzzy set, and Positive High (PH) fuzzy set.

7. The heuristic fuzzy controller for gantry cranes according to claim 1, wherein the membership functions are Gaussian.

8. The heuristic fuzzy controller for gantry cranes according to claim 1, wherein the set of heuristic fuzzy rules consists of 81 rules, the rules being:

| Fuzzy Rule No. | Variables | | | | |
|---|---|---|---|---|---|
| | $e(t)$ | $\dot{x}_c(t)$ | $\alpha(t)$ | $\dot{\alpha}(t)$ | $u(t)$ |
| 1 | NE | NE | NE | NE | ZE |
| 2 | NE | ZE | NE | NE | NS |
| 3 | NE | PO | NE | NE | NM |
| 4 | NE | NE | NE | ZE | ZE |
| 5 | NE | ZE | NE | ZE | NS |
| 6 | NE | PO | NE | ZE | NM |
| 7 | NE | NE | NE | PO | ZE |
| 8 | NE | ZE | NE | PO | NS |
| 9 | NE | PO | NE | PO | NM |
| 10 | ZE | NE | NE | NE | NM |
| 11 | ZE | ZE | NE | NE | NB |
| 12 | ZE | PO | NE | NE | NH |
| 13 | ZE | NE | NE | ZE | NS |
| 14 | ZE | ZE | NE | ZE | NM |
| 15 | ZE | PO | NE | ZE | NB |
| 16 | ZE | NE | NE | PO | ZE |
| 17 | ZE | ZE | NE | PO | NS |
| 18 | ZE | PO | NE | PO | NM |
| 19 | PO | NE | NE | NE | NM |
| 20 | PO | ZE | NE | NE | NB |
| 21 | PO | PO | NE | NE | NH |
| 22 | PO | NE | NE | ZE | NM |
| 23 | PO | ZE | NE | ZE | NB |
| 24 | PO | PO | NE | ZE | NH |
| 25 | PO | NE | NE | PO | NM |
| 26 | PO | ZE | NE | PO | NB |
| 27 | PO | PO | NE | PO | NH |
| 28 | NE | NE | ZE | NE | PS |
| 29 | NE | ZE | ZE | NE | ZE |
| 30 | NE | PO | ZE | NE | NS |
| 31 | NE | NE | ZE | ZE | PM |
| 32 | NE | ZE | ZE | ZE | PS |
| 33 | NE | PO | ZE | ZE | ZE |
| 34 | NE | NE | ZE | PO | PB |
| 35 | NE | ZE | ZE | PO | PM |
| 36 | NE | PO | ZE | PO | PS |
| 37 | ZE | NE | ZE | NE | ZE |
| 38 | ZE | ZE | ZE | NE | NS |
| 39 | ZE | PO | ZE | NE | NM |
| 40 | ZE | NE | ZE | ZE | PS |
| 41 | ZE | ZE | ZE | ZE | ZE |
| 42 | ZE | PO | ZE | ZE | NS |
| 43 | ZE | NE | ZE | PO | PM |
| 44 | ZE | ZE | ZE | PO | PS |
| 45 | ZE | PO | ZE | PO | ZE |
| 46 | PO | NE | ZE | NE | NS |
| 47 | PO | ZE | ZE | NE | NM |
| 48 | PO | PO | ZE | NE | NB |
| 49 | PO | NE | ZE | ZE | ZE |
| 50 | PO | ZE | ZE | ZE | NS |
| 51 | PO | PO | ZE | ZE | NM |
| 52 | PO | NE | ZE | PO | PS |
| 53 | PO | ZE | ZE | PO | ZE |
| 54 | PO | PO | ZE | PO | NS |
| 55 | NE | NE | PO | NE | PH |
| 56 | NE | ZE | PO | NE | PB |
| 57 | NE | PO | PO | NE | PM |
| 58 | NE | NE | PO | ZE | PH |
| 59 | NE | ZE | PO | ZE | PB |
| 60 | NE | PO | PO | ZE | PM |
| 61 | NE | NE | PO | PO | PH |
| 62 | NE | ZE | PO | PO | PB |
| 63 | NE | PO | PO | PO | PM |
| 64 | ZE | NE | PO | NE | PM |
| 65 | ZE | ZE | PO | NE | PS |
| 66 | ZE | PO | PO | NE | ZE |
| 67 | ZE | NE | PO | ZE | PB |
| 68 | ZE | ZE | PO | ZE | PM |
| 69 | ZE | PO | PO | ZE | PS |
| 70 | ZE | NE | PO | PO | PH |
| 71 | ZE | ZE | PO | PO | PB |
| 72 | ZE | PO | PO | PO | PM |
| 73 | PO | NE | PO | NE | PM |
| 74 | PO | ZE | PO | NE | PS |
| 75 | PO | PO | PO | NE | ZE |
| 76 | PO | NE | PO | ZE | PM |
| 77 | PO | ZE | PO | ZE | PS |
| 78 | PO | PO | PO | ZE | ZE |
| 79 | PO | NE | PO | PO | PM |
| 80 | PO | ZE | PO | PO | PS |
| 81 | PO | PO | PO | PO | ZE. |

9. The heuristic fuzzy controller for gantry cranes according to claim 1, wherein the defuzzifier is a center average defuzzifier.

* * * * *